US010469827B2

(12) United States Patent
Nagata et al.

(10) Patent No.: US 10,469,827 B2
(45) Date of Patent: Nov. 5, 2019

(54) IMAGE PROCESSING DEVICE AND IMAGE PROCESSING METHOD

(71) Applicant: SONY CORPORATION, Tokyo (JP)

(72) Inventors: Masaharu Nagata, Tokyo (JP); Yasuhiro Matsui, Kanagawa (JP)

(73) Assignee: SONY CORPORATION, Tokyo (JP)

(*) Notice: Subject to any disclaimer, the term of this patent is extended or adjusted under 35 U.S.C. 154(b) by 95 days.

(21) Appl. No.: 15/105,656

(22) PCT Filed: Oct. 31, 2014

(86) PCT No.: PCT/JP2014/079137
§ 371 (c)(1),
(2) Date: Jun. 17, 2016

(87) PCT Pub. No.: WO2015/098288
PCT Pub. Date: Jul. 2, 2015

(65) Prior Publication Data
US 2017/0032531 A1 Feb. 2, 2017

(30) Foreign Application Priority Data
Dec. 27, 2013 (JP) .................................. 2013-273231

(51) Int. Cl.
H04N 13/204 (2018.01)
H04N 13/254 (2018.01)
(Continued)

(52) U.S. Cl.
CPC ....... *H04N 13/204* (2018.05); *G01B 11/2513* (2013.01); *G01B 11/2545* (2013.01);
(Continued)

(58) Field of Classification Search
CPC .......... H04N 13/0203; H04N 13/0239; H04N 13/0253; H04N 13/0257; H04N 13/0271;
(Continued)

(56) References Cited
U.S. PATENT DOCUMENTS 7,103,212 B2 * 9/2006 Hager ...................... G06K 9/32
345/419
7,430,312 B2 * 9/2008 Gu .......................... G01B 11/25
345/419

(Continued)

FOREIGN PATENT DOCUMENTS

JP 2008-537190 A 9/2008
JP 2009-530604 A 8/2009
(Continued)

*Primary Examiner* — Brian P Yenke
(74) *Attorney, Agent, or Firm* — Chip Law Group

(57) ABSTRACT

There is an image processing device to obtain more accurate depth information, based on a pattern-irradiated infrared image and a pattern-irradiation-free infrared image. The image processing device includes a pattern irradiation unit that irradiates an infrared pattern onto a surface of a target object; and an infrared image capturing unit that captures an infrared image. The pattern irradiation unit performs irradiation at a predetermined timing corresponding to an infrared image capturing unit's image capturing timing. The infrared image capturing unit obtains a pattern-projected infrared image in which the pattern irradiated by the pattern irradiation unit is projected on the target object, and a pattern-free infrared image in which the pattern is not projected on the target object.

9 Claims, 10 Drawing Sheets

(51) Int. Cl.
  *H04N 13/271* (2018.01)
  *H04N 13/239* (2018.01)
  *G01B 11/25* (2006.01)
  *G06T 5/50* (2006.01)
  *H04N 5/33* (2006.01)
  *H04N 13/257* (2018.01)
  *H04N 13/00* (2018.01)

(52) U.S. Cl.
  CPC .............. *G06T 5/50* (2013.01); *H04N 5/33* (2013.01); *H04N 13/239* (2018.05); *H04N 13/254* (2018.05); *H04N 13/257* (2018.05); *H04N 13/271* (2018.05); *G06T 2207/10012* (2013.01); *G06T 2207/10028* (2013.01); *G06T 2207/10048* (2013.01); *G06T 2207/20221* (2013.01); *H04N 2013/0081* (2013.01); *H04N 2013/0092* (2013.01)

(58) Field of Classification Search
  CPC ... H04N 2013/0081; H04N 2013/0092; G01B 11/2513; G01B 11/2545; G06T 5/50; G06T 2207/10012; G06T 2207/10028; G06T 2207/20048; G06T 2207/20221
  See application file for complete search history.

(56) References Cited

U.S. PATENT DOCUMENTS

| | | | | |
|---|---|---|---|---|
| 8,797,385 | B2 * | 8/2014 | Tsuboi | H04N 13/0253 348/46 |
| 8,845,107 | B1 * | 9/2014 | Coley | G06T 19/20 353/28 |
| 9,084,002 | B2 * | 7/2015 | Tardif | G06F 3/011 |
| 9,098,908 | B2 * | 8/2015 | Kirk | G06T 7/0057 |
| 9,204,121 | B1 * | 12/2015 | Marason | G01B 11/2513 |
| 9,294,758 | B2 * | 3/2016 | Xiong | H04N 13/0271 |
| 9,383,549 | B2 * | 7/2016 | Ueno | G02B 13/0015 |
| 9,392,262 | B2 * | 7/2016 | Dal Mutto | G06K 9/2036 |
| 9,513,768 | B2 * | 12/2016 | Zhao | G06F 3/0482 |
| 9,538,081 | B1 * | 1/2017 | Zhou | H04N 5/23248 |
| 9,571,818 | B2 * | 2/2017 | Pulli | H04N 13/0253 |
| 9,710,923 | B2 * | 7/2017 | Ohba | G06T 7/215 |
| 9,743,065 | B2 * | 8/2017 | Kang | H04N 13/004 |
| 9,746,318 | B2 * | 8/2017 | Sugano | G01B 11/25 |
| 9,774,832 | B1 * | 9/2017 | Minami | H04N 9/3155 |
| 9,894,332 | B2 * | 2/2018 | Minami | H04N 9/3155 |
| 2005/0281475 | A1 * | 12/2005 | Wilson | G06F 3/0421 382/254 |
| 2006/0072914 | A1 * | 4/2006 | Arai | G01C 3/18 396/106 |
| 2006/0291014 | A1 * | 12/2006 | Hirata | G03B 21/14 358/504 |
| 2008/0297621 | A1 * | 12/2008 | Sun | H04N 5/23232 348/224.1 |
| 2009/0219253 | A1 * | 9/2009 | Izadi | G06F 3/0421 345/173 |
| 2010/0265316 | A1 * | 10/2010 | Sali | H04N 13/0253 348/46 |
| 2010/0328475 | A1 * | 12/2010 | Thomas | H04N 13/0022 348/222.1 |
| 2011/0025827 | A1 * | 2/2011 | Shpunt | H04N 13/0239 348/47 |
| 2011/0033088 | A1 * | 2/2011 | Rekimoto | G06F 3/0425 382/107 |
| 2011/0242334 | A1 * | 10/2011 | Wilburn | H04N 5/2354 348/207.1 |
| 2013/0095920 | A1 * | 4/2013 | Patiejunas | G06T 15/00 463/31 |
| 2013/0100256 | A1 | 4/2013 | Kirk et al. | |
| 2013/0215235 | A1 * | 8/2013 | Russell | G03B 35/00 348/47 |
| 2013/0229396 | A1 * | 9/2013 | Huebner | H04N 9/3147 345/207 |
| 2013/0265438 | A1 * | 10/2013 | Sugiyama | H04N 5/33 348/164 |
| 2013/0327218 | A1 * | 12/2013 | Izzi | B32B 5/022 95/281 |
| 2014/0002616 | A1 * | 1/2014 | Ohba | G06T 7/2086 348/47 |
| 2014/0192158 | A1 * | 7/2014 | Whyte | G06K 9/6201 348/46 |
| 2014/0241612 | A1 * | 8/2014 | Rhemann | G06T 7/0075 382/154 |
| 2014/0247364 | A1 * | 9/2014 | Kim | H04N 5/33 348/164 |
| 2014/0307056 | A1 * | 10/2014 | Collet Romea | H04N 13/0007 348/47 |
| 2014/0307058 | A1 * | 10/2014 | Kirk | H04N 13/239 348/47 |
| 2014/0362188 | A1 * | 12/2014 | Yokokawa | A63F 13/42 348/47 |
| 2015/0022669 | A1 * | 1/2015 | Hall | H04N 17/002 348/187 |
| 2015/0092018 | A1 * | 4/2015 | Kang | G01S 17/42 348/46 |
| 2015/0229915 | A1 * | 8/2015 | Kirk | H04N 5/33 348/51 |
| 2015/0256813 | A1 * | 9/2015 | Dal Mutto | H04N 13/254 348/47 |
| 2015/0268450 | A1 * | 9/2015 | Ueno | G02B 13/0015 348/360 |
| 2015/0304631 | A1 * | 10/2015 | Lee | H04N 13/0239 348/46 |
| 2015/0381965 | A1 * | 12/2015 | Atanassov | H04N 5/23245 348/47 |
| 2016/0065930 | A1 * | 3/2016 | Chandra | H04N 13/0007 348/46 |
| 2016/0139674 | A1 * | 5/2016 | Watanabe | G06F 3/017 345/156 |
| 2016/0194181 | A1 * | 7/2016 | Wang | B66B 1/468 348/77 |
| 2016/0253836 | A1 * | 9/2016 | Unten | G06T 17/00 345/420 |
| 2016/0259057 | A1 * | 9/2016 | Ito | G01S 17/10 |
| 2016/0349043 | A1 * | 12/2016 | Lee | G01B 11/2513 |
| 2018/0234643 | A1 * | 8/2018 | Kobayashi | H04N 7/18 |
| 2019/0033452 | A1 * | 1/2019 | Ito | G01S 17/10 |

FOREIGN PATENT DOCUMENTS

| | | |
|---|---|---|
| JP | 2011-232150 A | 11/2011 |
| JP | 2012-103239 A | 5/2012 |
| JP | 2012-122975 A | 6/2012 |

* cited by examiner

IMAGE PROCESSING DEVICE AND IMAGE PROCESSING METHOD

CROSS REFERENCE TO RELATED APPLICATIONS

This application is a U.S. National Phase of International Patent Application No. PCT/JP2014/079137 filed on Oct. 31, 2014, which claims priority benefit of Japanese Patent Application No. JP 2013-273231 filed in the Japan Patent Office on Dec. 27, 2013. Each of the above-referenced applications is hereby incorporated herein by reference in its entirety.

TECHNICAL FIELD

The present disclosure relates to an image processing device and an image processing method.

BACKGROUND ART

In recent years, as a method of generating a three-dimensional image of an object, a system like the one disclosed in Patent Literature 1 below which irradiates infrared (IR) rays and obtains depth information of an object to thereby generate a three-dimensional image, has been widely recognized.

Specifically, utilizing the characteristics of infrared rays that they are invisible to the human eye, the system irradiates a pattern onto the surface of the object using infrared rays and captures an image with an infrared camera, thereby obtaining the surface shape of the object in more detail and more accurately based on the captured image.

CITATION LIST

Patent Literature

Patent Literature 1: JP 2008-537190 A

SUMMARY

Technical Problem

However, there is an issue that irradiating the infrared pattern onto the object may cause loss of information, such as a contour of the object and a pattern on the surface of the object which are features the object originally has, and an accurate object shape may not be obtained depending on conditions.

Although there is also a system that additionally uses a visible light camera for capturing texture, in that case, in addition to the infrared camera for detecting depth, other types of cameras are required, and an issue of increase in system cost arises. Moreover, there arises an issue that the system becomes extremely large due to increase of signal processing for accurately matching positions of captured images captured by a plurality of types of cameras.

Furthermore, there is an issue that, if a visible light image projected by a projector overlaps the object, an accurate object shape cannot be obtained even with the visible light camera.

Accordingly, the present disclosure proposes an image processing device and an image processing method capable of obtaining a pattern-irradiated infrared image and a pattern-irradiation-free infrared image to obtain more accurate depth information by controlling an infrared pattern irradiation timing.

Solution to Problem

According to the present disclosure, there is provided an image processing device including: a pattern irradiation unit that irradiates an infrared pattern onto a surface of a target object; and an infrared image capturing unit that captures an infrared image. The pattern irradiation unit performs irradiation at a predetermined timing corresponding to an infrared image capturing unit's image capturing timing. The infrared image capturing unit obtains a pattern-projected infrared image in which the pattern irradiated by the pattern irradiation unit is projected on the target object, and a pattern-free infrared image in which the pattern is not projected on the target object.

According to the present disclosure, there is provided an image processing method including: irradiating an infrared pattern onto a surface of a target object by a pattern irradiation unit; and capturing an infrared image by an infrared image capturing unit. The pattern irradiation unit performs irradiation at a predetermined timing corresponding to an infrared image capturing unit's image capturing timing. The infrared image capturing unit obtains a pattern-projected infrared image in which the pattern irradiated by the pattern irradiation unit is projected on the target object, and a pattern-free infrared image in which the pattern is not projected on the target object.

Effects

As described above, according to the present disclosure, by controlling the timing of irradiating an infrared pattern, it becomes possible to obtain a pattern-irradiated infrared image and a pattern-irradiation-free infrared image for obtaining more accurate depth information.

Moreover, the effects described above are not necessarily limited, and along with or instead of the effects, any effect that is desired to be introduced in the present specification or other effects that can be expected from the present specification may be exhibited.

DESCRIPTION OF EMBODIMENTS

Hereinafter, embodiments of the present disclosure will be described in detail with reference to the appended drawings. In this specification and the drawings, elements that have substantially the same function and structure are denoted with the same reference symbols, and redundant description is omitted.

In addition, the description will be made in the following order.

1. Image Processing Device According to First Embodiment
 1-1. Configuration
 1-2. Operation
 1-3. Supplement
 1-4. Effect
2. Image Processing Device According to Second Embodiment
 2-1. Configuration
 2-2. Operation
 2-3. Effect
3. Image Processing According to Third Embodiment
 3-1. Configuration
 3-2. Operation
 3-3. Effect
4. Summary

1. Image Processing Device According to First Embodiment

<1-1. Configuration>

Figure 1:
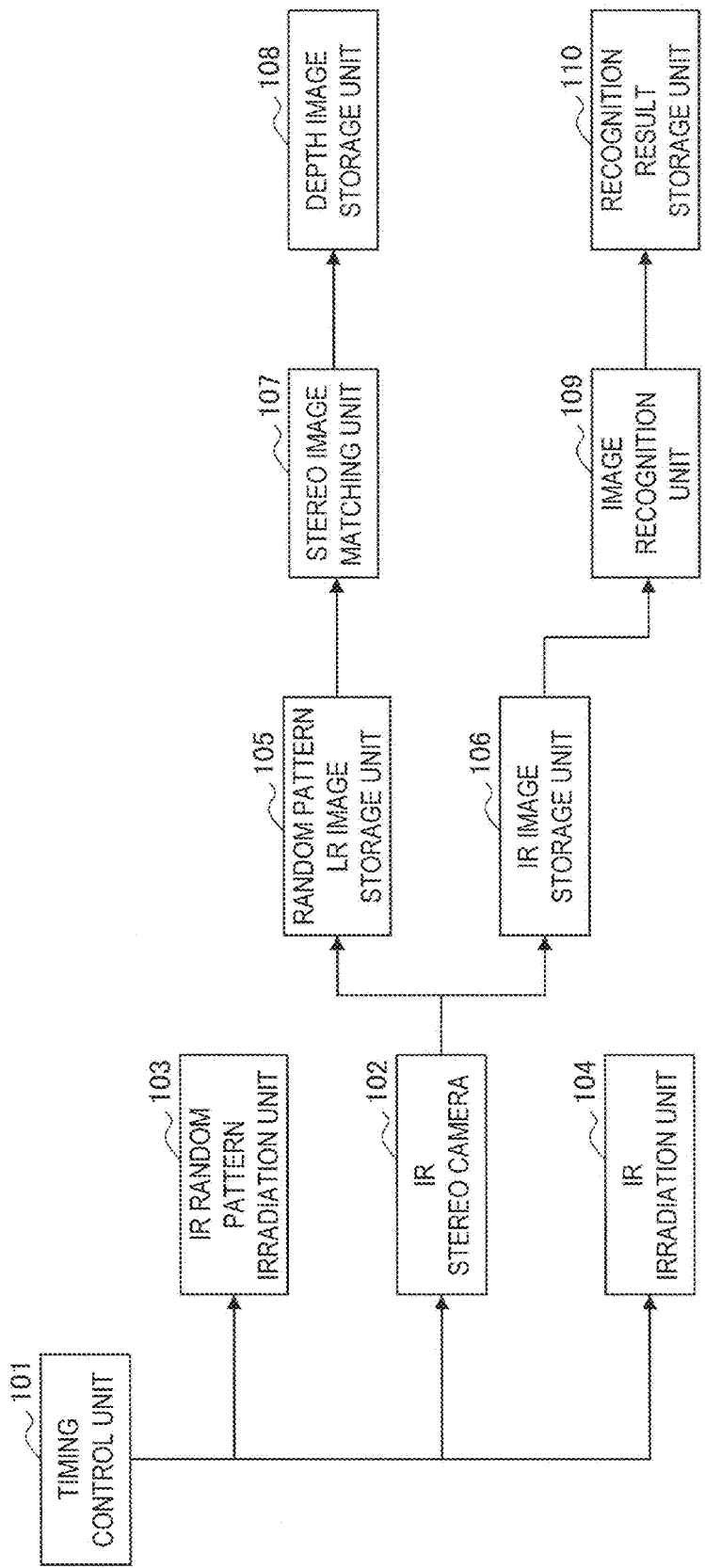
FIG. 1 is a block diagram showing a configuration of an image processing device according to a first embodiment.

First, a configuration of an image processing device 10-1 according to the first embodiment of the present disclosure will be described with reference to FIG. 1. FIG. 1 is a block diagram showing a configuration of the image processing device 10-1 according to the first embodiment.

As shown in FIG. 1, the image processing device 10-1 according to the present embodiment has a timing control unit 101, an IR stereo camera 102, an IR random pattern irradiation unit 103, an IR irradiation unit 104, a random pattern LR image storage unit 105, an IR image storage unit 106, a stereo image matching unit 107, a depth image storage unit 108, an image recognition unit 109, and a recognition result storage unit 110.

(Timing Control Unit)

The timing control unit 101 is composed of a control circuit that outputs pulses to the IR stereo camera 102, the IR random pattern irradiation unit 103, and the IR irradiation unit 104. The timing control unit 101 controls the IR random pattern irradiation unit 103 and the IR irradiation unit 104 to perform irradiation, for example, alternately at the timings of image capturing by the IR stereo camera 102, thereby enabling random pattern-irradiated images and pattern-free images to be captured alternately. Specific operation control of the image capturing and irradiation timings by the timing control unit 101 will be described later with reference to FIG. 4.

(IR Stereo Camera)

The IR stereo camera 102 is an example of an infrared image capturing unit composed of two cameras capable of capturing only an IR (infrared) region. Specifically, the IR stereo camera 102 can capture an image of only the IR region, for example, by mounting a visible light cut filter. In addition, the two cameras constituting the IR stereo camera 102 are positioned with an interval for generating a sufficient parallax. In these two cameras, because the shutters are released (images are captured) at the rising edge of an IR stereo camera control pulse 201 (see FIG. 4) from the timing control unit 101, there occurs no time lag in image capturing between the two cameras.

(IR Random Pattern Irradiation Unit)

The IR random pattern irradiation unit 103 is an example of a pattern irradiation unit that irradiates an infrared (IR) pattern onto the surface of a target object, and it irradiates an IR random pattern. Here, FIG. 2 shows a structure of the IR random pattern irradiation unit 103 according to the first embodiment.

Figure 2:
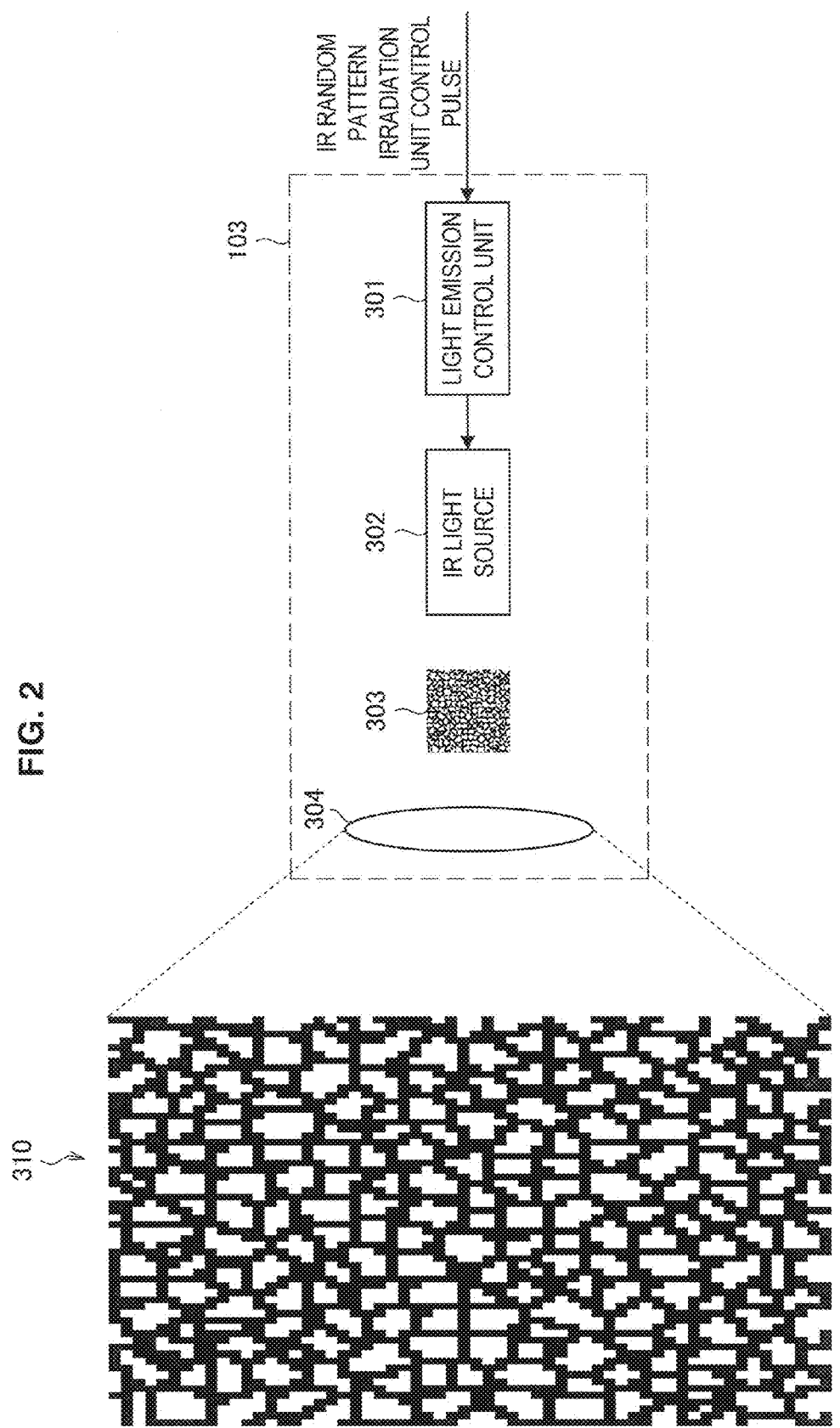
FIG. 2 is a diagram showing a structure of an IR random pattern irradiation unit according to the first embodiment.

As shown in FIG. 2, the IR random pattern irradiation unit 103 has a light emission control unit 301, an IR light source 302, an IR random pattern mask 303, and a projection lens 304.

The light emission control unit 301 controls light emission by causing electric current to flow to the IR light source 302 for a certain period in accordance with the rising of an IR random pattern irradiation unit control pulse (see FIG. 4) input from the timing control unit 101. In the present embodiment, the light emission control unit 301 causes constant current to flow while an IR random pattern irradiation unit control pulse 202 is high.

The IR light source 302 is an infrared ray emission unit and is implemented with an infrared LED (Light Emitting Diode), for example. While the light emission control unit 301 causes electric current to flow, the IR light source 302 irradiates infrared wavelength (e.g. wavelength around 850 nm). The infrared rays irradiated from the IR light source 302 pass through the random pattern mask 303.

The random pattern mask 303 is implemented with a metal mesh plate which has been subjected to minute and random drilling processing by electroforming, for example. The random mesh can be implemented, for example, by positioning points randomly and then generating a Voronoi diagram using the points as generators. Although, in addition, a minute random pattern can also be projected, for example, by printing a random pattern or dots on a film or using etching on glass, infrared rays are enabled to pass through the random pattern without being attenuated using the minute drilling processing by electroforming.

The projection lens 304 causes an IR random pattern 310 formed by infrared rays that passed through the random pattern mask 303 to be projected onto the target object. Although, in the example shown in FIG. 2, the projection lens 304 is shown as a single lens for simplicity, it may actually be composed of a combination of a plurality of concave lenses and convex lenses according to intended use, such as a necessary angle of view and focal distance.

(IR Irradiation Unit)

The IR irradiation unit 104 has the function of irradiating pattern-free infrared rays. Because a specific structure of the IR irradiation unit 104 is obtained by removing the random pattern mask 303 from the IR random pattern irradiation unit 103 shown in FIG. 2, and the components other than that are the same, its description will be omitted here. The inclusion of the IR irradiation unit 104 in the configuration provides the effect that brighter IR images can be obtained.

The IR irradiation unit 104 is not an essential component in the image processing device 10-1 according to the present embodiment, and it can be omitted if there is ambient light that includes infrared rays moderately, such as a light bulb. In addition, because the IR irradiation unit 104 do not need to irradiate the IR random pattern 310, the optical lens, such as the projection lens 304, can also be omitted if there is an environment in which infrared rays can be irradiated uniformly, such as when the distance between the target object (subject) and the IR irradiation unit 104 is sufficiently close.

(Random Pattern LR Image Storage Unit)

The random pattern LR image storage unit 105 stores two IR random pattern-irradiated images (L image and R image) captured by the IR stereo camera 102 composed of two infrared cameras (left camera, right camera) while the IR random pattern irradiation unit 103 projects the IR random pattern 310.

(Stereo Image Matching Unit)

The stereo image matching unit 107 is a depth calculation unit that generates a depth image having depth information using the LR images stored in the random pattern LR image storage unit 105. Although various conventionally known techniques can be used as a method of generating a depth image, a block matching method is used here as an example. Hereinafter, the method will be described in detail with reference to FIG. 3.

Figure 3:
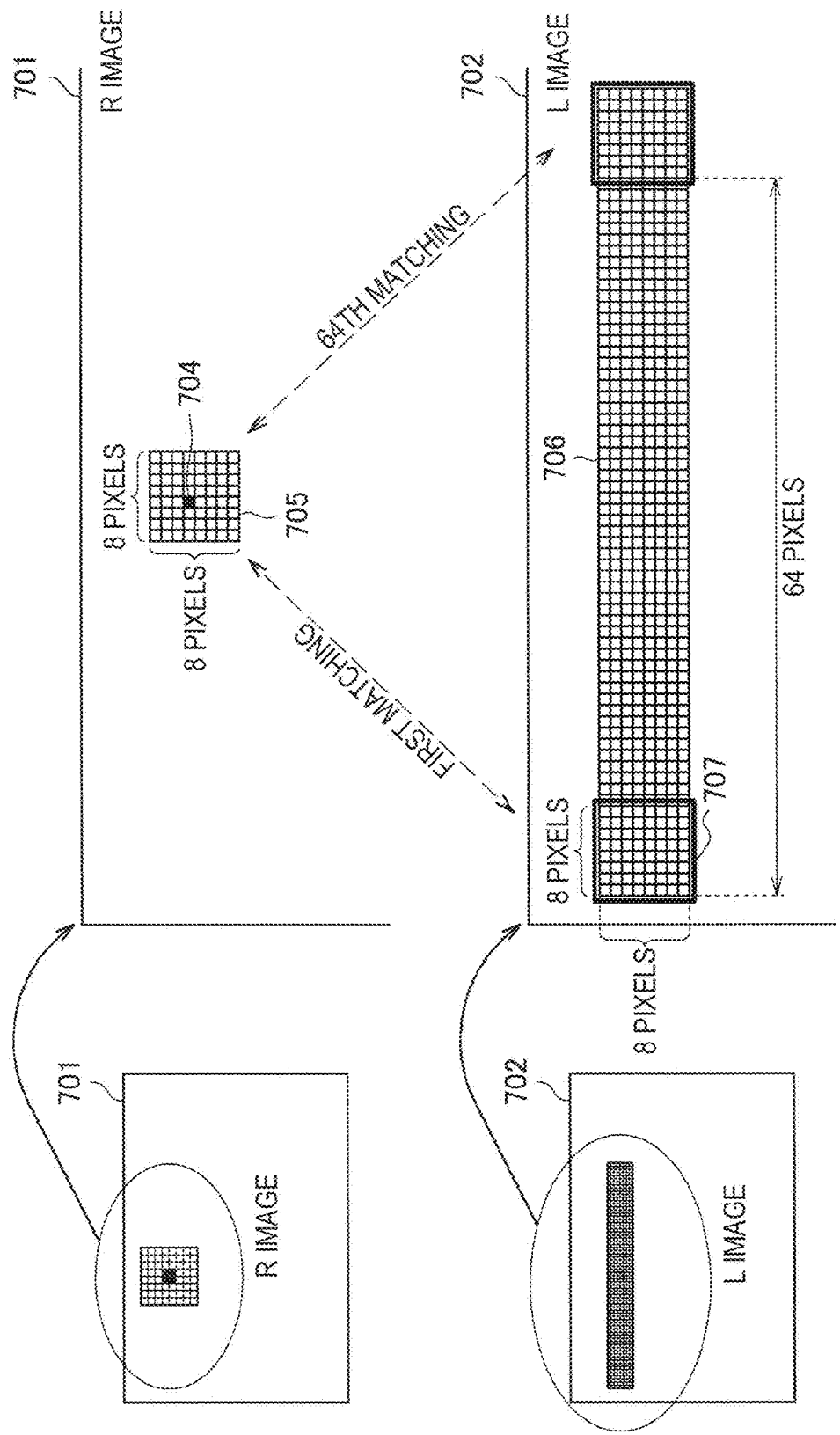
FIG. 3 is a diagram for illustrating a block matching method by a stereo image matching unit according to the first embodiment.

FIG. 3 is a diagram for illustrating the block matching method by the stereo image matching unit 107 according to the first embodiment. In the example shown in FIG. 3, a random pattern R image 701 captured by the right side camera constituting the IR stereo camera 102 and a random pattern L image 702 captured by the left side camera are matched for each block.

Specifically, when, for example, image matching is performed per block of 8×8, a block that is close to a block 705 of 8×8 pixels having a target pixel 704 as a center in the R image 701 captured by the right camera is searched from the L image 702, to thereby obtain a parallax. More specifically, the stereo image matching unit 107 performs image comparison between the block 705 of 8×8 in the random pattern R image and the block 707 of 8×8 in the random pattern L image, for each of all horizontal pixels in a search range 706 in the L image 702. For example, when the search range 706 has 64 pixels, block image matching is performed 64 times for each pixel of the R image 701 which is an input image, and this is performed for all the pixels of the R image 701, which is the input image.

Thus, as the stereo image matching unit 107 performs matching of the right and left images on a per block basis, even a target object having no features on the surface (flat with no pattern) such as, for example, a white box which has not been able to be subjected to matching so far, can be subjected to matching accurately by using the IR random pattern-irradiated images.

Further, the right camera and the left camera constituting the IR stereo camera 102 are fixed, and the distance (baseline length) between the cameras is fixed. Therefore, the depth can be obtained based on the parallax obtained by block matching and the baseline length.

By performing the above-described matching processing on all the pixels, a depth image of the entire screen can be obtained.

(Depth Image Storage Unit)

The depth image storage unit 108 stores the depth image obtained by the stereo image matching unit 107.

(IR Image Storage Unit)

The IR image storage unit 106 stores an IR image (pattern-free infrared image) captured by the IR stereo camera 102 while the IR irradiation unit 104 performs irradiation. Here, the IR image stored in the IR image storage unit 106 may be an image captured by either the left camera or the right camera constituting the IR stereo camera 102. Specifically, only the L image captured by the left camera or only the R image captured by the right camera may be used, or, alternatively, the LR images captured by the both cameras may be stored and used, according to intended use.

(Image Recognition Unit)

The image recognition unit 109 performs conventionally known image recognition processing (e.g. edge detection processing with a differential filter, etc.) including recognition of the contour of the target object and performing character recognition, based on the IR image (pattern-free infrared image) stored in the IR image storage unit 106.

In particular, in the case of image processing like character recognition in which lines constituting a character are important information, if the image stored in the random pattern LR image storage unit 105 on which the random pattern is projected is used, the random pattern causes generation of an unintended shadow on the character, and resulting in decline of the recognition rate. In addition, if the random pattern-irradiated image is used, not only the contour of the subject but also the contour of the random pattern are detected in the edge detection processing such as differential filtering, and the contour of the subject cannot be obtained accurately. Therefore, the image recognition unit 109 uses the IR image stored in the IR image storage unit 106 on which no random pattern is irradiated, thereby recognizing characters written on the surface of the target object, such as a title of a book, and the contour of the target object accurately.

Further, when the visible light camera is used in image processing in which the contour of the object is important information to recognize the shape of the target object, it may cause decline of the recognition rate of the contour. For example, if a visible light image is projected from the projector onto a table, etc., and the user performs operation input manually for the image projected on the table, a position of the hand, the shape of the hand, and change of the hand shape, etc. are used as operation input information. In this case, if the visible light camera is used, the projected image is reflected on the surface of the hand which is the target object, and therefore, the recognition rate of the shape and contour of the hand declines. Accordingly, the image recognition unit 109 according to the present embodiment uses the IR image captured by the IR stereo camera 102 implemented with the infrared cameras, thereby recognizing the shape and contour of the hand accurately without being affected by the projected visible light image reflected on the hand surface.

(Recognition Result Storage Unit)

The recognition result storage unit 110 stores the result recognized in the image recognition unit 109.

The image processing device 10-1 having the above-described configuration can recognize and output a three-dimensional shape (depth image) of the target object (subject), and characters written on the surface of the target object and the contour of the target object. Next, the operation control of the image capturing and irradiation timings by the timing control unit 101 will be described specifically with reference to FIG. 4.

<1-2. Operation>

Figure 4:
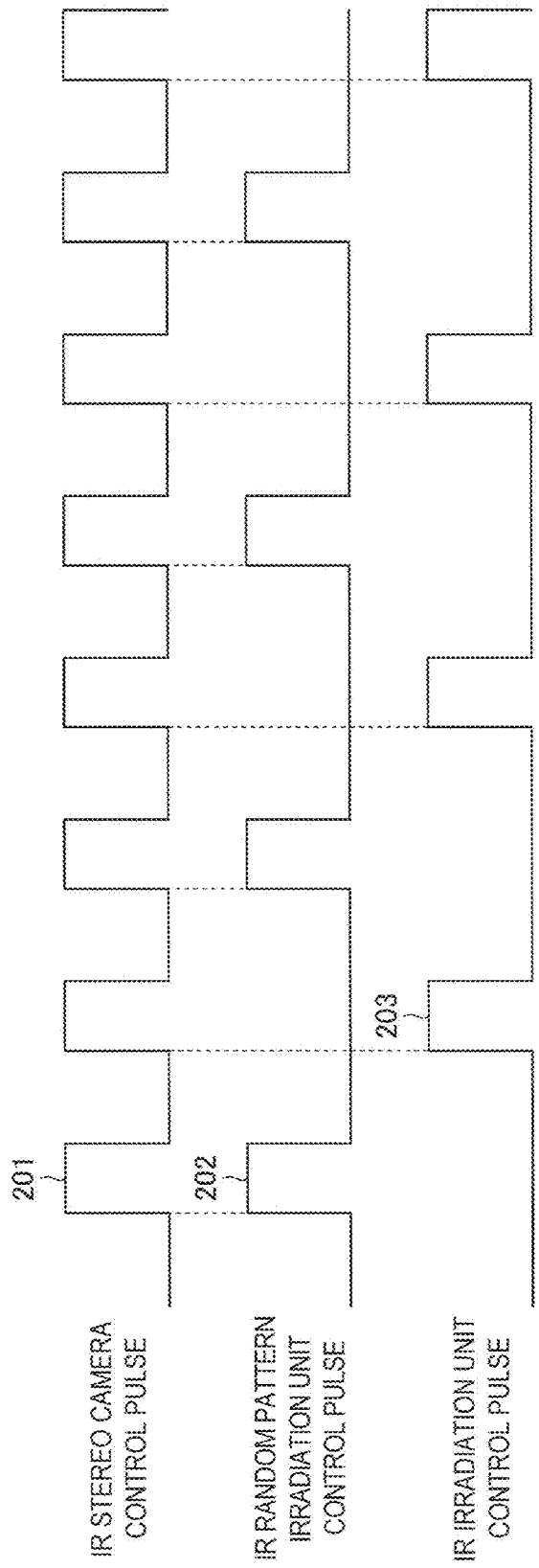
FIG. 4 shows a diagram obtained by cutting out portions of pulse waveforms output from a timing control unit according to the first embodiment.

FIG. 4 is a diagram obtained by cutting out portions of pulse waveforms output from the timing control unit 101. As shown in FIG. 4, the control pulse 201 is a control pulse transmitted to the IR stereo camera 102, and the IR stereo camera 102 is designed to release a shutter (capture an image) at the rising edge of this pulse.

In addition, the control pulses 202 and 203 are control pulses transmitted to the IR random pattern irradiation unit 103 and the IR irradiation unit 104, respectively, and the irradiation units are designed to turn on the IR light source for a certain period at the rising edges of these pulses. The control timings of the random pattern irradiation unit 103 and IR irradiation unit 104 are set to cause light emission alternately in the half cycle of the IR stereo camera control pulse 201, as shown in FIG. 4. Specifically, the random pattern irradiation unit 103 performs irradiation (emits light) at the odd or even timings of the IR stereo camera control pulses 201 (timings of image capturing by the IR stereo camera 102), and the IR irradiation unit 104 emits light at the timings different from the timings of light emission by the random pattern irradiation unit 103.

In doing so, the IR stereo camera 102 can obtain an image of the target object on which the random pattern is irradiated (pattern-projected infrared image) and an image of the target object on which IR without any patterns is irradiated (pattern-free infrared image) alternately in time.

The irradiation control timings of the random pattern irradiation unit 103 and the IR irradiation unit 104 are not limited to the example shown in FIG. 4. These irradiation control timings may also be output at predetermined timings corresponding to the timings of image capturing by the IR stereo camera 102 (IR stereo camera control pulses 201), according to intended use. For example, if the shape of a fast moving target object (e.g. the hand) is desired to be recognized more accurately, the number of the timings of irradiation by the random pattern irradiation unit 103 is increased, and the IR irradiation unit 104 is caused to perform irradiation at the timings different from the timings of irradiation by the random pattern irradiation unit 103. Specifically, a control pulse is output to the random pattern irradiation unit 103, the control pulse causing the random pattern irradiation unit 103 to perform irradiation at a predetermined interval, such as an interval in which irradiation is performed a plurality of times consecutively, and then a pause is held once, and a control pulse is output to the IR irradiation unit 104, the control pulse causing the IR irradiation unit 104 to perform irradiation once after the random pattern irradiation unit 103 performs irradiation a plurality of times.

In any case, the timing control unit 101 can enable the IR stereo camera 102 to obtain an image of the target object on which the random pattern is irradiated (pattern-projected infrared image) and an image of the target object on which pattern-free IR irradiation is performed (pattern-free infrared image) at different timings in time.

After the images are obtained, as described above, the stereo image matching unit 107 generates the depth image while the image recognition unit 109 performs image processing, such as character recognition.

<1-3. Supplement>

Next, supplemental explanation of the present embodiment will be made.

Although, in the above-described embodiment, the depth information is detected using the IR stereo camera 102, the present embodiment is not limited thereto, and the depth information can also be detected using a monocular IR camera.

In this case, the image processing device 10-1 stores the random pattern for IR irradiation in advance and performs block matching between the stored random pattern and an image captured by one IR camera, to thereby calculate the depth. Hereinafter, the description will be made with reference to FIG. 5.

Figure 5:
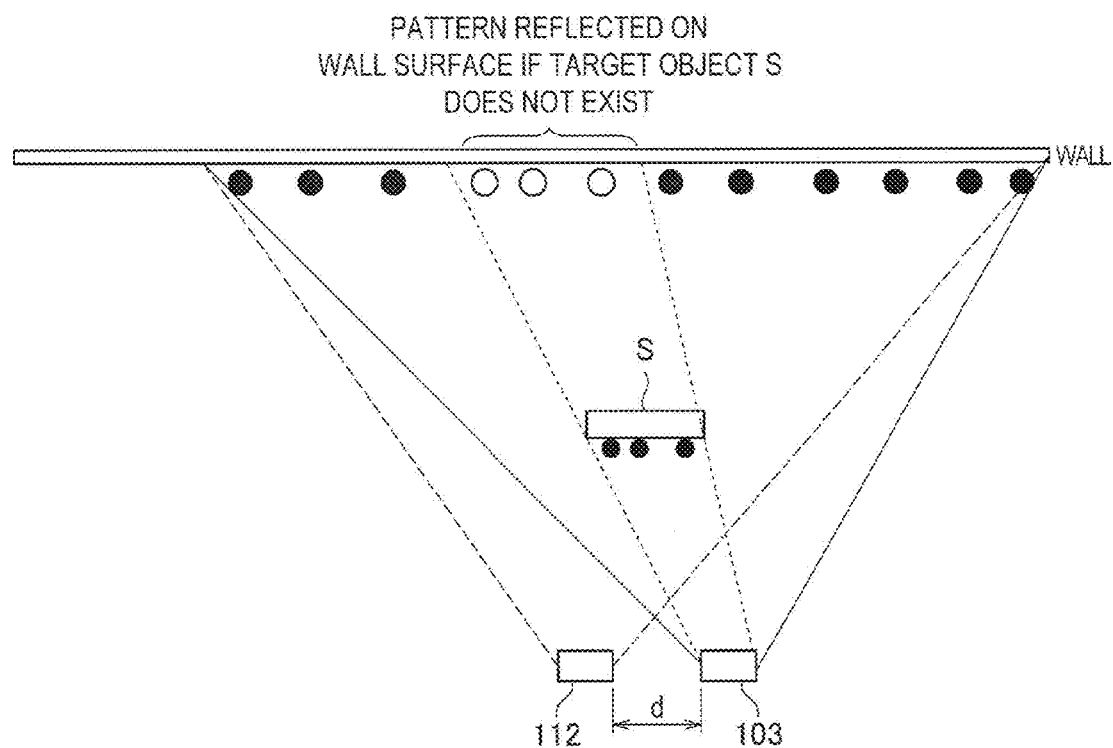
FIG. 5 is a diagram for illustrating the case where depth information is detected using a monocular IR camera.

FIG. 5 is a diagram for illustrating the case where depth information is detected using a monocular IR camera 112. The distance d between the monocular IR camera 112 and the IR random pattern irradiation unit 103 shown in FIG. 5 is known.

The image processing unit 10-1 calculates the depth using the known distance d based on coordinate values of the random pattern subjected to matching on the image captured by the IR camera 112, and in particular, based on a coordinate position of the random pattern reflected on the target object S. More specifically, the image processing device 10-1 estimates a coordinate position of the pattern which could be reflected on the wall surface if the target object S does not exist, and detects the depth information in accordance with a parallax between the estimated coordinate position and the coordinate position of the random pattern reflected on the target object S.

<1-4. Effect>

As described above, with the first embodiment, it is possible to obtain accurate depth information by irradiating the infrared random pattern onto the object, even if the object has no feature on its surface. Further, by also obtaining the infrared image on which the random pattern is not irradiated, it is also possible to precisely perform image processing which does not require the random pattern or which is affected by the random pattern in terms of accuracy, etc.

Further, because the camera is used in a time sharing manner for obtaining the depth and for processing the image, there is no need of adjusting the positions of two cameras, and the two resulting positions can be matched easily.

Further, by turning on the IR random pattern irradiation unit 103 and the IR irradiation unit 104 alternately so as to synchronize with the shutter timings (timings of image capturing), the light emission intervals of the irradiation units are extended, and the duty ratio of light emission can be reduced. Then, as the duty ratio of light emission can be reduced, it becomes possible to increase the amount of electric current flowed at once and provide brighter light emission. In doing so, the effects that are effective in image processing after image capturing, such as enabling increase of the shutter speed or enabling reduction of gain to suppress noise, can be obtained.

2. Image Processing Device According to Second Embodiment

Next, an image processing device 10-2 according to the second embodiment will be described with reference to FIGS. 6 and 7.

<2-1. Configuration>

Figure 6:
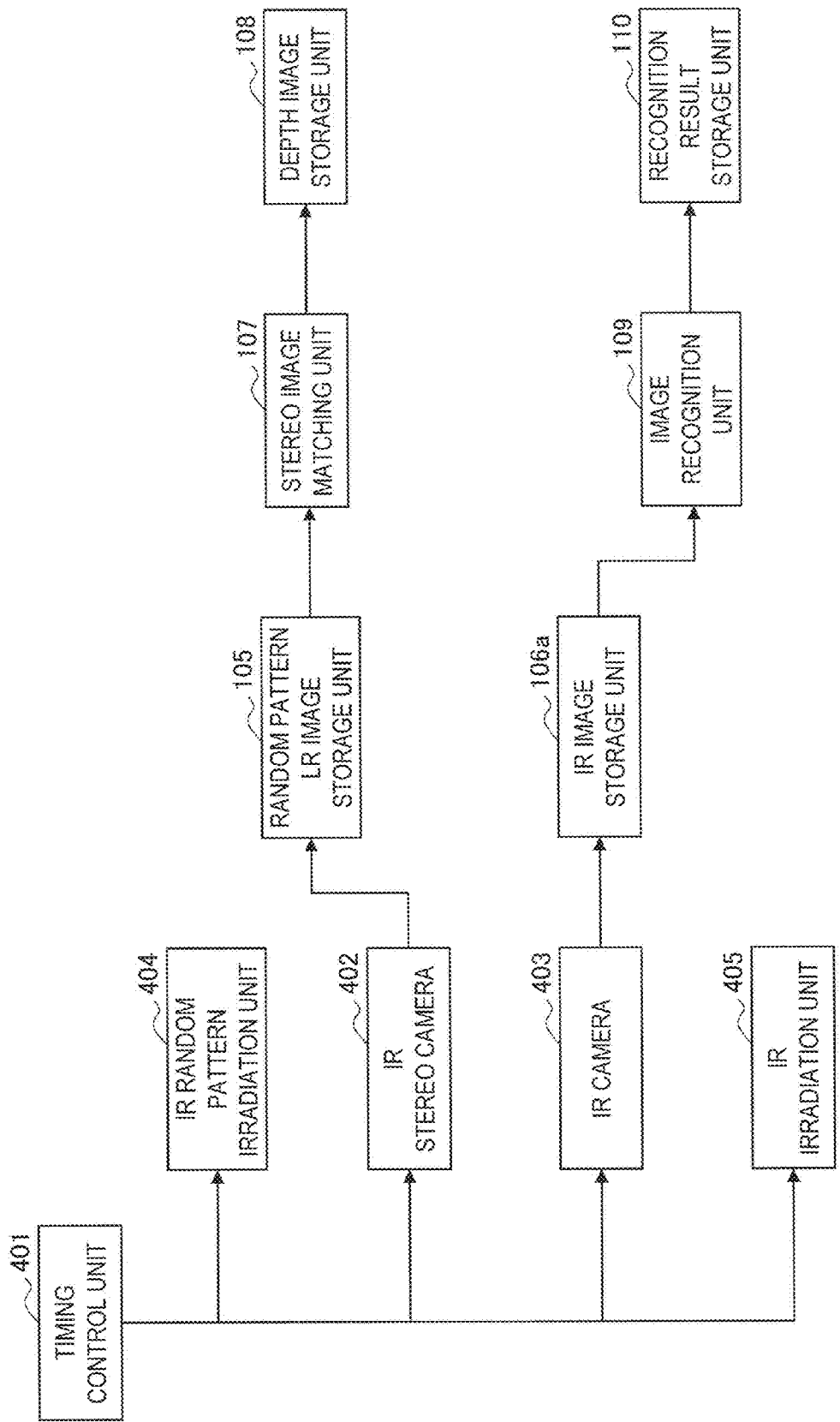
FIG. 6 is a block diagram showing a configuration of an image processing device according to a second embodiment.

FIG. 6 is a block diagram showing a configuration of the image processing device 10-2 according to the second embodiment. As shown in FIG. 6, the image processing device 10-2 has a timing control unit 401, an IR stereo camera 402, an IR camera 403, an IR random pattern irradiation unit 404, an IR irradiation unit 405, the random pattern LR image storage unit 105, an IR image storage unit 106a, the stereo image matching unit 107, the depth image storage unit 108, the image recognition unit 109, and the recognition result storage unit 110.

Because the random pattern LR image storage unit 105, the stereo image matching unit 107, the depth image storage unit 108, the image recognition unit 109, and the recognition result storage unit 110 are similar to those in the first embodiment described with reference to FIG. 1, their description will be omitted here.

(Timing Control Unit)

The timing control unit 401 is composed of a control circuit that outputs pulses to the IR stereo camera 402, the IR camera 403, the IR random pattern irradiation unit 404, and the IR irradiation unit 405. The control of the image capturing and irradiation timings by the timing control unit 401 will be described later with reference to FIG. 7.

(IR Random Pattern Irradiation Unit)

Although the structure of the IR random pattern irradiation unit 404 is similar to the IR random pattern irradiation unit 103 of the first embodiment described with reference to FIG. 2, it differs from the IR random pattern irradiation unit 103 in that a light source is selected so that the wavelength of the IR light source 302 becomes, for example, 850 nm.

(IR Irradiation Unit)

Although the structure of the IR irradiation unit 405 is also similar to the IR irradiation unit 104 according to the first embodiment, it differs from the IR irradiation unit 104 in that a light source is selected so that the wavelength of the IR light source becomes, for example, 750 nm.

(IR Stereo Camera)

The IR stereo camera 402 has a bandpass filter, a low-pass filter, or a high-pass filter that allows, for example, the wavelength around 850 nm in the IR (infrared) region to pass through, and the IR stereo camera 402 has a structure in which light having the wavelength other than 850 nm has the lowered sensitivity and is not easily exposed. In doing so, the IR stereo camera 402 can capture an image of the target object on which the random pattern irradiated from the IR random pattern irradiation unit 404 is superposed.

(IR Camera)

The IR camera 403 has a bandpass filter, a low-pass filter, or a high-pass filter that allows, for example, a wavelength around 750 nm in the IR (infrared) region to pass through, and the IR camera 403 has a structure in which light having the wavelength other than 750 nm has the lowered sensitivity and is not easily exposed. In doing so, because the IR camera 403 cuts off the wavelength irradiated from the random pattern irradiation unit 404, it is possible to capture a (pattern-free) image in which the random pattern is not superposed on the subject.

The IR camera 403 can be implemented with at least one infrared camera.

(IR Image Storage Unit)

The IR image storage unit 106a stores one image captured by the IR camera 403 implemented with at least one infrared camera.

The image processing device 10-2 having the above-described configuration can recognize and output the three-dimensional shape (depth image) of the target object (subject), and characters written on the surface of the target object and the contour of the target object, like the first embodiment.

<2-2. Operation>

Next, the operation control of the image capturing and irradiation timings by the timing control unit 401 will be described in detail with reference to FIG. 7.

Figure 7:
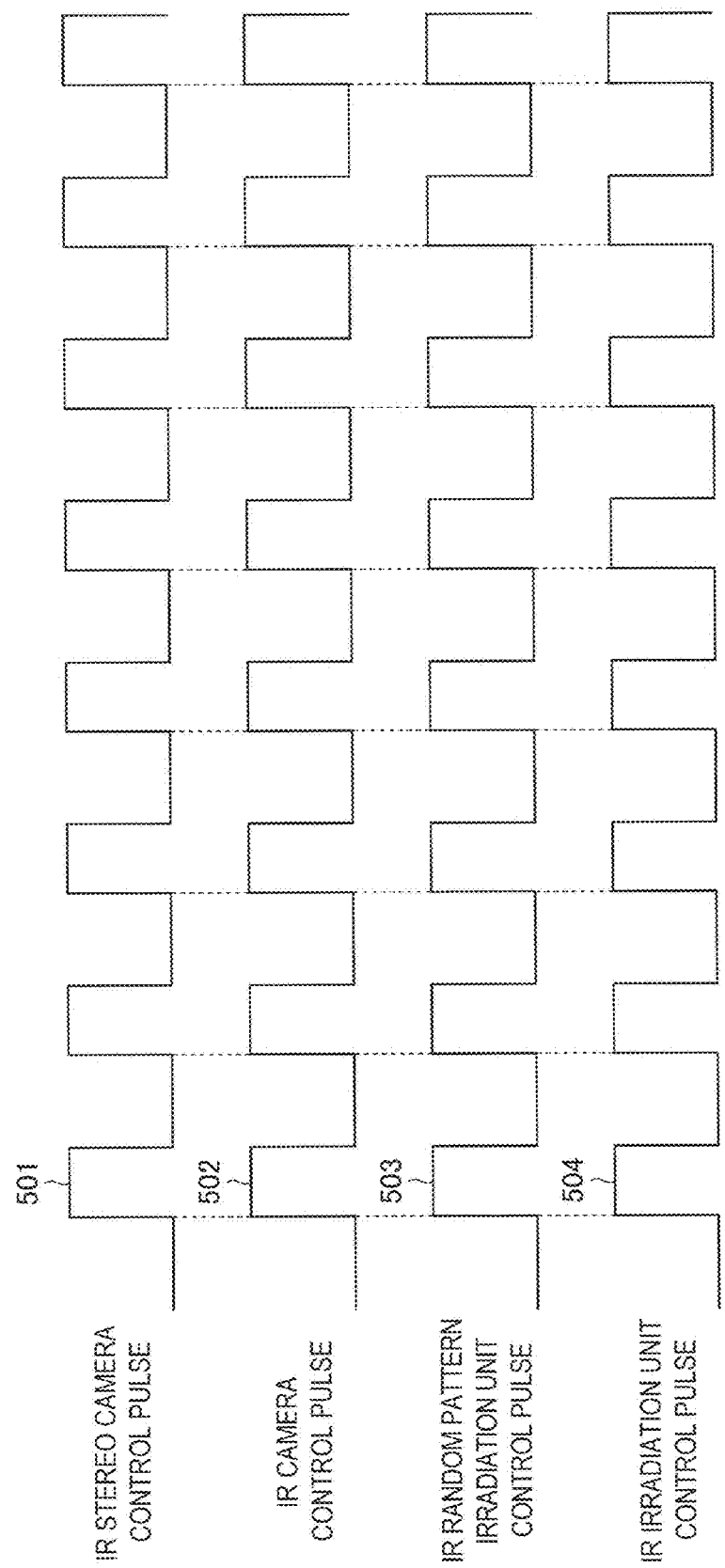
FIG. 7 is a diagram obtained by cutting out portions of pulse waveforms output from a timing control unit according to the second embodiment.

FIG. 7 is a diagram obtained by cutting out portions of pulse waveforms output from the timing control unit 401. As shown in the timing waveforms in FIG. 7, control pulses 501 to 504 input to the blocks are sync pulses.

The IR stereo camera 402 and the IR camera 403 are designed to release their shutters at the rising edges of the sync pulses. In addition, the IR random pattern irradiation unit 404 and the IR irradiation unit 405 are designed to turn on the IR light source for a certain period at the rising edges of the sync pulses.

In other words, the timing control unit 401 according to the present embodiment controls the timings of image capturing by the IR stereo camera 402 and the IR camera 403 and the timings of irradiation by the IR random pattern irradiation unit 404 and the IR irradiation unit 405 to be the same timings.

Even if the IR stereo camera 402 captures the image at the timing of irradiating the random pattern from the IR random pattern irradiation unit 404, the IR camera 403 has the filter for cutting off the irradiation wavelength of the random pattern as described above, and therefore, it is possible to capture a (pattern-free) image in which the random pattern is not superposed on the subject. In doing so, it is possible to obtain an infrared image having a pattern and an infrared image having no pattern, without generating a time lag.

After obtaining the images, like in the first embodiment, the stereo image matching unit 107 generates a depth image, while the image recognition unit 109 performs image processing, such as character recognition.

<2-3. Effect>

With the second embodiment having the above-described configuration, like the first embodiment, it is possible to obtain the effects that accurate depth information can be obtained even if the object has no feature on its surface, and that image processing, which does not require the random pattern or which is affected by the random pattern in terms of accuracy, etc., can be performed precisely.

Further, in the second embodiment, unlike the first embodiment, the IR random pattern is irradiated in a predetermined wavelength, and images are captured such that the IR stereo camera 402 on which an optical filter through which the predetermined wavelength passes is installed is synchronized with the IR camera 403 on which an optical filter which cuts off the predetermined wavelength is installed. This causes the effect that, without producing a time lag between the image on which the random pattern is projected and the image on which no random pattern is projected, both image processing results are synthesized and associated more easily.

3. Image Processing Device According to Third Embodiment

Next, an image processing device 10-3 according to the third embodiment will be described with reference to FIG. 8 to FIG. 10. With the present embodiment, it is possible to alleviate the load of computation processing by the stereo image matching unit 107 according to the above-described embodiments and also generate a higher-resolution depth image.

<3-1. Configuration>

Figure 8:
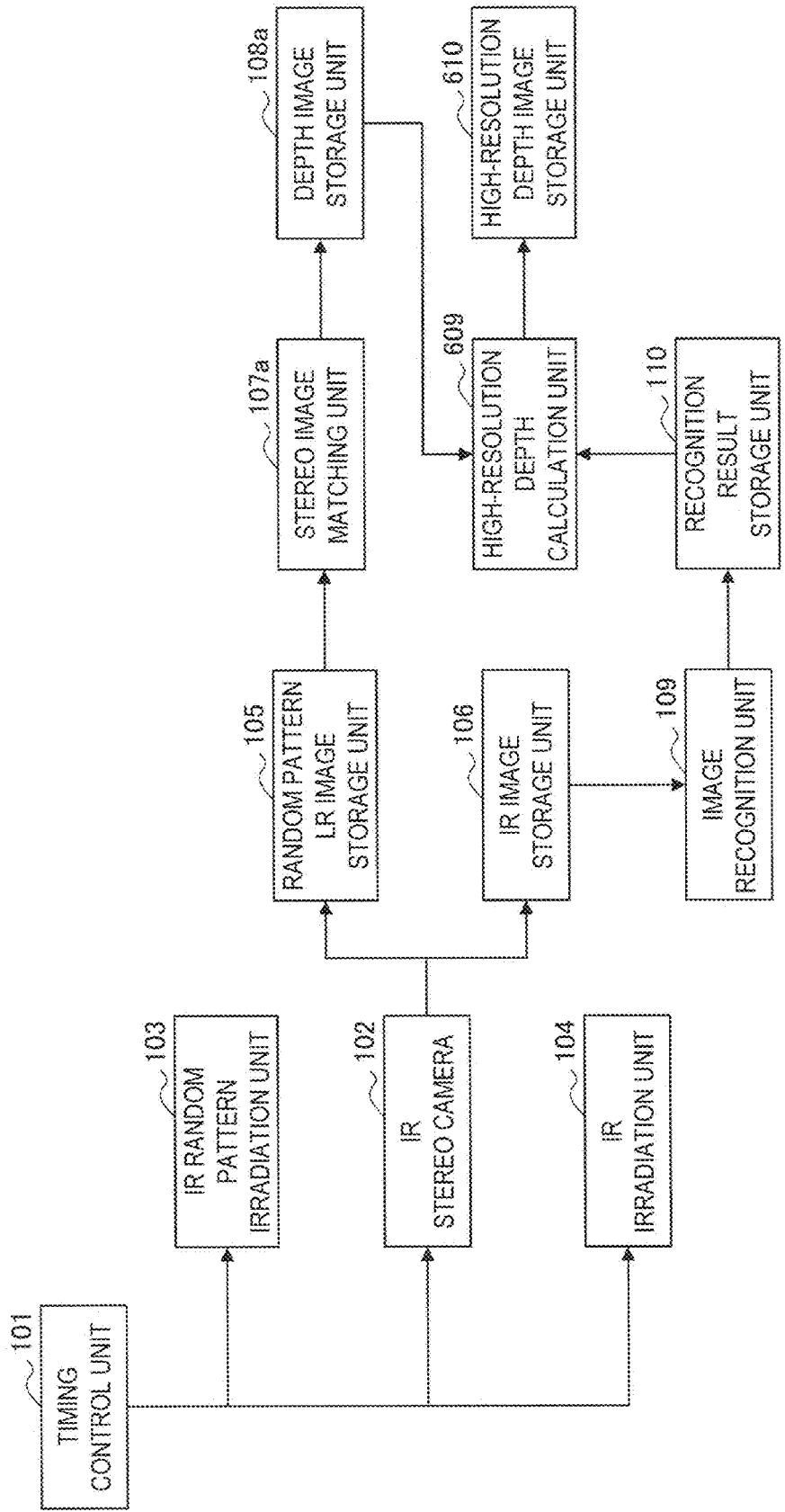
FIG. 8 is a block diagram showing a configuration of an image processing device according to a third embodiment.

FIG. 8 is a block diagram showing a configuration of the image processing device 10-3 according to the third embodiment. As shown in FIG. 8, the image processing device 10-3 has the timing control unit 101, the IR stereo camera 102, the IR random pattern irradiation unit 103, the IR irradiation unit 104, the random pattern LR image storage unit 105, the IR image storage unit 106, a stereo image matching unit 107a, a depth image storage unit 108a, the image recognition unit 109, the recognition result storage unit 110, a high resolution depth calculation unit 609, and a high-resolution depth image storage unit 610.

Because the timing control unit 101, the IR stereo camera 102, the IR random pattern irradiation unit 103, IR irradiation unit 104, the random pattern LR image storage unit 105, the IR image storage unit 106, the image recognition unit 109, and the recognition result storage unit 110 are similar to those in the first embodiment described with reference to FIG. 1, their description will be omitted here.

(Stereo Image Matching Unit)

The stereo image matching unit 107a generates a depth image based on the LR images of the target object stored in the random pattern LR image storage unit 105 on which the random pattern is projected. Here, although various methods of generating the depth image are possible, if the block matching method which has been described with reference to FIG. 3 is used, as described above, matching is performed on all the pixels in the R image 701, which is the input image, and there is an issue that the amount of computation is very large. Therefore, if such computation processing is implemented by software, it cannot be processed in real time, and if it is implemented by dedicated hardware, such as LSI (Large Scale Integration), the scale of the circuit is increased, resulting in increased cost of LSI.

In consideration of this, in order to reduce the amount of computation in block matching, it is possible to carry out a method of reducing the size of the R image 701 and L image 702, which are the input images, or a method of reducing the number of matching times such that the number of matching times are decimated by performing matching per two pixels or four pixels horizontally and per two pixels or four pixels vertically, but not on all the pixels in the R image 701. However, although these methods have great effect in reduction of the amount of computation, they have an issue that the resolution of obtained depth information is degraded. Hereinafter, FIG. 9 shows an example of depth images according to the amount of computation. In the depth images 801, 802a, and 803b shown in FIG. 9, the darker color in the images indicate being far from the camera, while the lighter color indicate being near from the camera.

Figure 9:
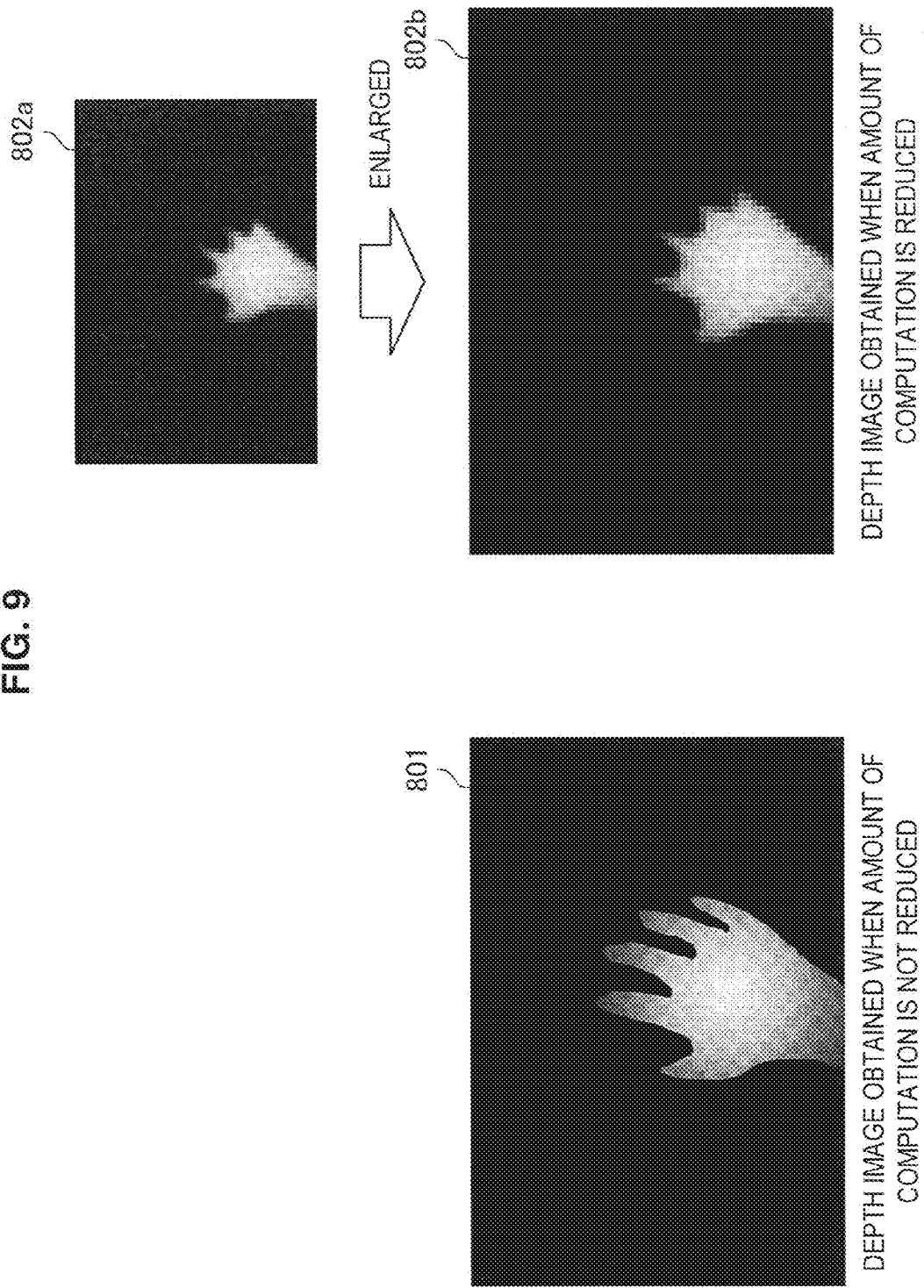
FIG. 9 is a diagram showing an example of depth images of the case where the amount of computation is reduced and the case where the amount of computation is not reduced.

FIG. 9 is a diagram showing an example of the depth images obtained when the amount of computation is not reduced and when the amount of computation is reduced. As shown in FIG. 9, in a (high-resolution) depth image 801 obtained when the amount of computation is not reduced, even the shape of the fingers can be identified if the hand is captured as the target object.

On the other hand, in the (low-resolution) depth image 802a obtained when an image of the hand, which is the same target object, is captured and the amount of computation is reduced, the shape of the fingers cannot be identified. The depth image 802a is a low-resolution depth image generated when the method of reducing the size of the R image 701 and the L image 702, which are the input images, is used as the method of reducing the amount of computation. Further, in the example shown in FIG. 9, the depth image 802b obtained by enlarging the depth image 802a is also shown for comparison with the depth image 801.

Thus, when the amount of computation is reduced, the shape of the target object cannot be identified, and therefore, it becomes problematic in particular when the shape of the fingers is important information. Accordingly, in the present embodiment, the below-described high-resolution depth calculation unit 609 synthesizes the contour image of the IR image with the low-resolution depth image, to thereby generate a high-resolution depth image.

(Depth Image Storage Unit)

The depth image storage unit 108a stores the low-resolution depth image which is generated in the stereo image matching unit 107a and in which the amount of computation is reduced.

(High-Resolution Depth Calculation Unit)

The high-resolution depth calculation unit 609 obtains, from the recognition result storage unit 110, the contour information of the target object recognized based on the IR image. As described in the first embodiment, the recognition result storage unit 110 stores the contour information of the target object recognized by the image recognition unit 109 based on the IR image. In addition, the high-resolution depth calculation unit 609 obtains, from the depth image storage unit 108a, the low-resolution depth image generated based on the LR images, which have been reduced to reduce the amount of computation.

Then, the high-resolution depth calculation unit 609 generates a high-resolution depth image based on the contour information of the target object and the low-resolution depth image. Hereinafter, the specific description will be made with reference to FIG. 10.

Figure 10:
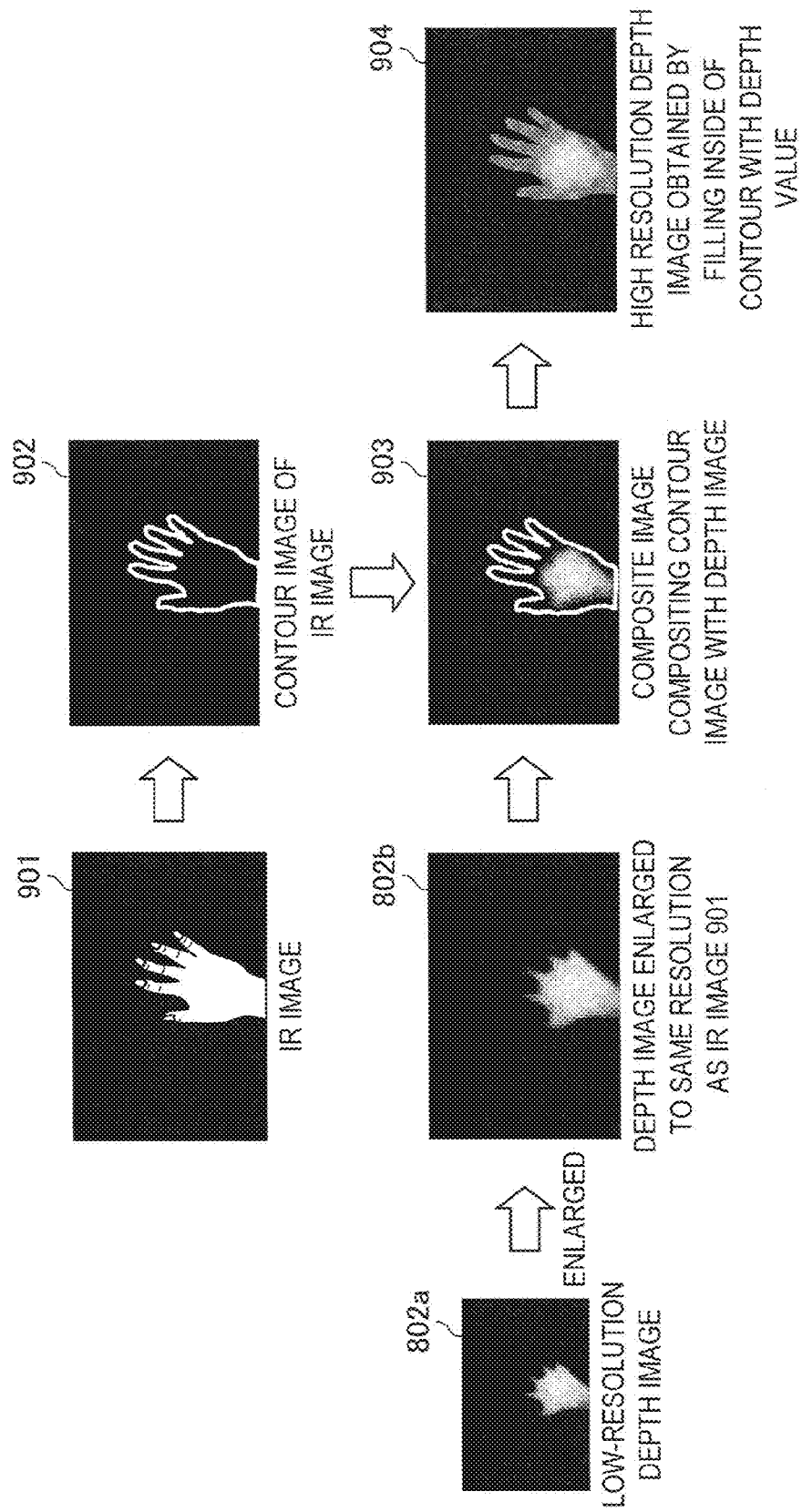
FIG. 10 is a diagram for illustrating generation of a high-resolution depth image according to the third embodiment.

FIG. 10 is a diagram for illustrating generation of the high-resolution depth image according to the present embodiment. An IR image 901 shown in FIG. 10 is a random pattern-free IR image which has been captured by the IR stereo camera 102 at the time of irradiation by the IR irradiation unit 104 and stored in the IR image storage unit 106. In addition, a contour image 902 is an image having contour information of the target object obtained by the image recognition unit 109 by applying a differential filter, etc. based on the IR image 901 stored in the IR image storage unit 106. Such a contour image 902 is stored in the recognition result storage unit 110.

On the other hand, the low-resolution depth image 802a is a depth image generated by the stereo image matching unit 107a by reducing the L image and the R image, which are the input images, to reduce the amount of computation. The L image and the R image, which are the inputs, are the IR images with the random pattern captured by the IR stereo camera 102 at the time of irradiation of the random pattern by the IR random pattern irradiation unit 103. The depth image 802a generated by the stereo image matching unit 107a is stored in the depth image storage unit 108a.

Then, the high-resolution depth calculation unit 609 obtains and synthesizes the low-resolution depth image 802a stored in the depth image storage unit 108a and the contour image 902 of the IR image stored in the recognition result storage unit 110. Specifically, the high-resolution depth calculation unit 609 enlarges the low-resolution depth image 802a as shown in FIG. 10 and synthesizes the enlarged depth image 802b with the contour image 902.

In a synthesized image 903 shown in FIG. 10, the shape of the fingers can be identified by the contour. Here, the high-resolution depth calculation unit 609 replaces, inside the contour, the dark-colored region having no effective depth value with values of the outermost periphery of pixels having effective depth values obtained from the depth image 802b, to fill the region, thereby obtaining a high-resolution depth image 904.

The depth image 904 having high-definition contour information generated by the high-resolution depth calculation unit 609 is stored in the high-resolution depth image storage unit 610.

<3-2. Operation>

The configuration of the image processing device 10-3 according to the present embodiment and generation of the high-resolution depth image have been described specifically. The control of the image capturing and irradiation timings by the timing control unit 101 of the image processing device 10-3 is similar to the first embodiment described with reference to FIG. 4, and therefore, its description will be omitted here.

<3-3. Effect>

As described above, with the third embodiment, it is possible to reduce the amount of computation in depth calculation, for example, by reducing the input image or performing decimation, and obtain a high-resolution depth image.

In addition, like the first embodiment, by obtaining the depth information based on the image on which the IR random pattern is projected, it is possible to obtain the depth information from even a flat subject having no pattern. Further, by using the image on which the IR random pattern is not projected, it is possible to perform edge processing of the target object accurately.

The configuration of the third image processing device 10-3 according to the third embodiment is not limited to the example shown in FIG. 8. For example, the image processing device 10-3 may have the timing control unit 401, the IR random pattern irradiation unit 404, the IR stereo camera 402, the IR camera 403, the IR irradiation unit 405, and the IR image storage unit 106a shown in the second embodiment, in place of the timing control unit 101, the IR random pattern irradiation unit 103, the IR stereo camera 102, the IR irradiation unit 104, and the IR image storage unit 106.

4. Summary

As described above, the image processing devices 10-1 to 10-3 according to the embodiments of the present disclosure control the timing of infrared pattern irradiation thereby obtaining the infrared image on which the pattern is irradiated and the infrared image on which the pattern is not irradiated, to obtain more accurate depth information.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for enabling hardware integrated in the above-described image processing devices 10-1 to 10-3, such as a CPU, ROM, and RAM, to perform the functions of the image processing devices 10-1 to 10-3. A computer readable storage medium in which the computer program is stored is also provided.

Further, generation of the depth information based on the IR image captured by the monocular IR camera 112 and the random pattern stored in advance can also be performed in the second and the third embodiments in a similar manner to that described in the supplement of the first embodiment.

In addition, the effects described in the present specification are merely illustrative and demonstrative, and not limitative. In other words, the technology according to the present disclosure can exhibit other effects that are evident to those skilled in the art along with or instead of the effects based on the present specification. Additionally, the present technology may also be configured as below.

(1) An image processing device including:
  a pattern irradiation unit that irradiates an infrared pattern onto a surface of a target object; and
  an infrared image capturing unit that captures an infrared image, wherein the pattern irradiation unit performs irradiation at a predetermined timing corresponding to an infrared image capturing unit's image capturing timing, and
  the infrared image capturing unit obtains a pattern-projected infrared image in which the pattern irradiated by the pattern irradiation unit is projected on the target object, and a pattern-free infrared image in which the pattern is not projected on the target object.

(2) The image processing device according to (1), wherein the pattern irradiation unit irradiates simultaneously with predetermined interval of the infrared image capturing unit's image capturing timings.

(3) The image processing device according to (2), wherein the pattern irradiation unit irradiates at odd or even timings of the infrared image capturing unit's image capturing timings.

(4) The image processing device according to (2) or (3), further including
  an infrared irradiation unit having no pattern, wherein,
  among the infrared image capturing unit's image capturing timings, the infrared irradiation unit irradiates a pattern-free infrared ray at a timing different from the pattern irradiation unit's irradiation timing.

(5) The image processing device according to (4), wherein the infrared irradiation unit irradiates the pattern-free infrared ray alternately with the pattern irradiation unit.

(6) The image processing device according to any one of (1) to (5), further including
  a first depth calculation unit that performs block matching on the basis of the pattern-projected infrared image captured by the infrared image capturing unit and a pattern preliminarily stored and irradiated by the pattern irradiation unit, to calculate depth information of the target object.

(7) The image processing device according to any one of (1) to (5), wherein the infrared image capturing unit includes two or more infrared image capturing units, and
  the image processing device further comprises
    a second depth calculation unit that performs block matching on the basis of pattern-projected infrared images captured from a plurality of viewpoints by the two or more infrared image capturing units, to calculate depth information of the target object.

(8) The image processing device according to (1), wherein the pattern irradiation unit irradiates the pattern using an infrared ray of a predetermined wavelength,
  the infrared image capturing unit includes a first infrared image capturing unit and a second infrared image capturing unit,
  the first infrared image capturing unit includes at least one of a bandpass filter, a low-pass filter, and a high-pass filter that allows infrared rays around a wavelength irradiated by the pattern irradiation unit to pass through, and
  the second infrared image capturing unit includes at least one of a bandpass filter, a low-pass filter, and a high-pass filter that cuts off an infrared ray having the wavelength irradiated by the pattern irradiation unit.

(9) The image processing device according to (8), further including
  an infrared irradiation unit having no pattern, wherein
  the second infrared image capturing unit includes a bandpass filter, a low-pass filter, or a high-pass filter that allows infrared rays around the wavelength irradiated by the infrared irradiation unit to pass through.

(10) The image processing device according to (9), wherein timings of image capturing by the first infrared image capturing unit and the second infrared image capturing unit and timings of irradiation by the infrared irradiation unit and the pattern irradiation unit are all the same timings.

(11) The image processing device according to any one of (1) to 5 and 8 to (10), further including
a third depth calculation unit that performs block matching requiring reduced amount of computation on the basis of the pattern-projected infrared image captured by the infrared image capturing unit and a pattern preliminarily stored and irradiated by the pattern irradiation unit, to calculate low-resolution depth information of the target object.

(12) The image processing device according to any one of (1) to 5 and 8 to (10), wherein
the infrared image capturing unit includes two or more infrared image capturing units and
the image processing device further includes
a fourth depth calculation unit that performs block matching requiring reduced amount of computation on the basis of pattern-projected infrared images captured from a plurality of viewpoints by the two or more infrared image capturing units, to calculate low-resolution depth information of the target object.

(13) The image processing device according to (12), further including
a high-resolution depth calculation unit that calculates high-resolution depth information of the target object on the basis of the low-resolution depth information calculated by the fourth depth calculation unit and contour information of the target object extracted from the pattern-free infrared image.

(14) The image processing device according to any one of (1) to (14), wherein the pattern is a random pattern.

(15) The image processing device according to any one of (1) to (14), wherein the pattern is formed by causing an infrared ray to pass through a mask formed by electroforming.

(16) An image processing method including:
irradiating an infrared pattern onto a surface of a target object by a pattern irradiation unit; and
capturing an infrared image by an infrared image capturing unit, wherein
the pattern irradiation unit performs irradiation at a predetermined timing corresponding to an infrared image capturing unit's image capturing timing, and
the infrared image capturing unit obtains a pattern-projected infrared image in which the pattern irradiated by the pattern irradiation unit is projected on the target object, and a pattern-free infrared image in which the pattern is not projected on the target object.

REFERENCE SYMBOLS LIST 10-1, 10-2, 10-3 image processing device
101, 401 timing control unit
102, 402 IR stereo camera
112 monocular IR camera
403 IR camera
103, 404 IR random pattern irradiation unit
104 IR irradiation unit
105 random pattern LR image storage unit
106, 106a IR image storage unit
107, 107a stereo image matching unit
108, 108a depth image storage unit
109 image recognition unit
110 recognition result storage unit
201, 501 IR stereo camera control pulse
202, 503 IR random pattern irradiation unit control pulse
203, 504 IR irradiation unit control pulse
301 light emission control unit
302 IR light source
303 IR random pattern mask
304 projection lens
310 IR random pattern
502 IR camera control pulse
609 high-resolution depth calculation unit
610 high-resolution depth image storage unit
801 depth image obtained when the amount of computation is not reduced
802a depth image obtained when the amount of computation is reduced
802b (enlarged) depth image obtained when the amount of computation is reduced
901 IR image
902 contour image
903 synthesized image
904 high resolution depth image

The invention claimed is:

1. An image processing device, comprising:
a pattern irradiation unit configured to irradiate an infrared pattern onto a surface of a target object;
at least two infrared image capturing units configured to:
capture, at a first timing, a plurality of pattern-projected infrared images from a plurality of viewpoints, wherein
the plurality of pattern-projected infrared images comprises the infrared pattern irradiated by the pattern irradiation unit on the target object, and
the pattern irradiation unit is turned on at the first timing; and
capture, at a second timing, a pattern-free infrared image, wherein
the pattern irradiation unit is turned off at the second timing, and
the first timing is different from the second timing;
a depth calculation unit configured to:
execute a block matching operation based on the plurality of pattern-projected infrared images; and
calculate low-resolution depth information of the target object based on the executed block matching operation; and
a high-resolution depth calculation unit configured to calculate high-resolution depth information of the target object based on synthesis of the low-resolution depth information and contour information of the target object, wherein the contour information of the target object is extracted from the pattern-free infrared image.

2. The image processing device according to claim 1, further comprising an infrared irradiation unit configured to uniformly irradiate, at the second timing, a pattern-free infrared ray on the surface of the target object.

3. The image processing device according to claim 2, wherein the infrared irradiation unit is further configured to irradiate the pattern-free infrared ray alternately with the pattern irradiation unit.

4. The image processing device according to claim 2, wherein
the pattern irradiation unit is further configured to irradiate the infrared pattern a plurality of times consecutively onto the surface of the target object, and
the infrared irradiation unit is further configured to irradiate the pattern-free infrared ray after the irradiation of the infrared pattern.

5. The image processing device according to claim 1, wherein
the pattern irradiation unit is further configured to irradiate the infrared pattern with an infrared ray of a first wavelength, the at least two infrared image capturing units includes a first infrared image capturing unit and a second infrared image capturing unit, the first infrared image capturing unit includes at least one of a first bandpass filter, a first low-pass filter, or a first high-pass filter, the at least one of the first bandpass filter, the first low-pass filter, or the first high-pass filter is configured to pass first infrared rays, the first infrared rays have second wavelengths within a range of the first wavelength, the second infrared image capturing unit includes at least one of a second bandpass filter, a second low-pass filter, or a second high-pass filter, and the at least one of the second bandpass filter, the second low-pass filter, or the second high-pass filter is configured to cut off the infrared ray of the first wavelength.

6. The image processing device according to claim 5, further comprising an infrared irradiation unit configured to uniformly irradiate, at the second timing, a pattern-free infrared ray of a third wavelength, wherein the second infrared image capturing unit includes one of the second bandpass filter, the second low-pass filter, or the second high-pass filter, the one of the second bandpass filter, the second low-pass filter, or the second high-pass filter is further configured to pass second infrared rays, and the second infrared rays are within a range of the third wavelength.

7. The image processing device according to claim 1, wherein the infrared pattern is a random pattern.

8. The image processing device according to claim 1, wherein the pattern irradiation unit is further configured to irradiate the infrared pattern based on passage of an infrared ray through a pattern mask.

9. An image processing method, comprising:

in an image processing device that includes a pattern irradiation unit and at least two infrared image capturing units:

irradiating an infrared pattern onto a surface of a target object by the pattern irradiation unit;

capturing, by the at least two infrared image capturing units at a first timing, a plurality of pattern-projected infrared images from a plurality of viewpoints, wherein the plurality of pattern-projected infrared images comprises the infrared pattern irradiated by the pattern irradiation unit on the target object, and the pattern irradiation unit is turned on at the first timing;

capturing pattern-free infrared image by the at least two infrared image capturing units at a second timing, wherein the pattern irradiation unit is turned off at the second timing, and the first timing is different from the second timing;

executing a block matching operation based on the plurality of pattern-projected infrared images; and calculating low-resolution depth information of the target object based on the executed block matching operation; and calculating high-resolution depth information of the target object based on synthesis of the low-resolution depth information and contour information of the target object, wherein the contour information of the target object is extracted from the pattern-free infrared image.

* * * * *